US012602157B2

(12) United States Patent
Marquinez Torrecilla et al.

(10) Patent No.: US 12,602,157 B2
(45) Date of Patent: Apr. 14, 2026

(54) SIMULATION DEVICE SUITABLE FOR USE IN AUGMENTED-REALITY OR VIRTUAL-REALITY ENVIRONMENTS

(71) Applicant: Seabery North America Inc., Annapolis, MD (US)

(72) Inventors: Pedro Gerardo Marquinez Torrecilla, Severna Park, MD (US); Juan José Chica Barrera, Aljaraque-Huelva (ES); Jesús Calvo Pérez, Bollullos Par del Condado-Huelva (ES); David Barroso De La Rosa, Huelva (ES); Víctor López Márquez, Huelva (ES); María Sacristán García, Huelva (ES)

(73) Assignee: Seabery North America Inc., Annapolis, MD (US)

( * ) Notice: Subject to any disclaimer, the term of this patent is extended or adjusted under 35 U.S.C. 154(b) by 259 days.

(21) Appl. No.: 18/546,272

(22) PCT Filed: Feb. 18, 2022

(86) PCT No.: PCT/ES2022/070086
§ 371 (c)(1),
(2) Date: Aug. 13, 2023

(87) PCT Pub. No.: WO2022/175583
PCT Pub. Date: Aug. 25, 2022

(65) Prior Publication Data
US 2025/0085845 A1     Mar. 13, 2025

(30) Foreign Application Priority Data
Feb. 18, 2021     (ES) ............................... ES202130127

(51) Int. Cl.
*G06F 3/048*     (2013.01)
*G06F 3/01*     (2006.01)
(Continued)

(52) U.S. Cl.
CPC .......... *G06F 3/04883* (2013.01); *G06F 3/011* (2013.01); *G06F 3/041* (2013.01); (Continued)

(58) Field of Classification Search
None
See application file for complete search history.

(56) References Cited

U.S. PATENT DOCUMENTS 9,937,578 B2 * 4/2018 Becker .................. G06T 19/006
10,460,621 B2 * 10/2019 Chica Barrera ......... G09B 9/00
(Continued)

FOREIGN PATENT DOCUMENTS

CN        201237840 Y     5/2009
CN        111085757 A     5/2020
(Continued)

OTHER PUBLICATIONS

International Search Report and Written Opinion in related International application No. PCT/ES2022/070086, dated Apr. 27, 2022.

*Primary Examiner* — Tuan S Nguyen
(74) *Attorney, Agent, or Firm* — Nathan & Associates Patent Agents Ltd.; Menachem Nathan

(57)                ABSTRACT

The present invention relates to a simulation device suitable for use in augmented reality and/or virtual reality environments, which comprises: a rod (1); one or more markers (3) arranged on the rod (1); and a touch actuator (2) arranged on the rod (1). The device is characterized in that the actuator (2) comprises encoding means for encoding the movement of at least a finger of the hand of a user of said device, longitudinally along the rod (1). Said device is useful for simulating techniques of depositing and/or removing welding material, industrial paint and/or surgical and/or odontological procedures. The method for interacting with the augmented reality and/or virtual reality environment com-
(Continued)

prises a pincer movement using two fingers of the hand on the rod (1), moving the fingers longitudinally along same and activating, for that purpose, the actuator (2).

18 Claims, 9 Drawing Sheets

(51) Int. Cl.

| | | |
|---|---|---|
| *G06F 3/041* | (2006.01) | |
| *G06F 3/04883* | (2022.01) | |
| *G06T 7/70* | (2017.01) | |
| *G09B 9/00* | (2006.01) | |
| *G09B 19/24* | (2006.01) | |

(52) U.S. Cl.
CPC ................. *G06T 7/70* (2017.01); *G09B 9/00* (2013.01); *G09B 19/24* (2013.01)

(56) References Cited

U.S. PATENT DOCUMENTS

| | | | |
|---|---|---|---|
| 11,288,978 B2 * | 3/2022 | Becker | B23K 9/0956 |
| 2012/0122062 A1 * | 5/2012 | Yang | G09B 9/00 434/219 |

FOREIGN PATENT DOCUMENTS

| | | | | |
|---|---|---|---|---|
| EP | 3537412 A1 | 9/2019 | | |
| ES | 2438440 A1 | 1/2014 | | |
| ES | 2688421 T3 | 11/2018 | | |
| WO | WO-2021102809 A1 * | 6/2021 | | G01M 99/00 |

* cited by examiner

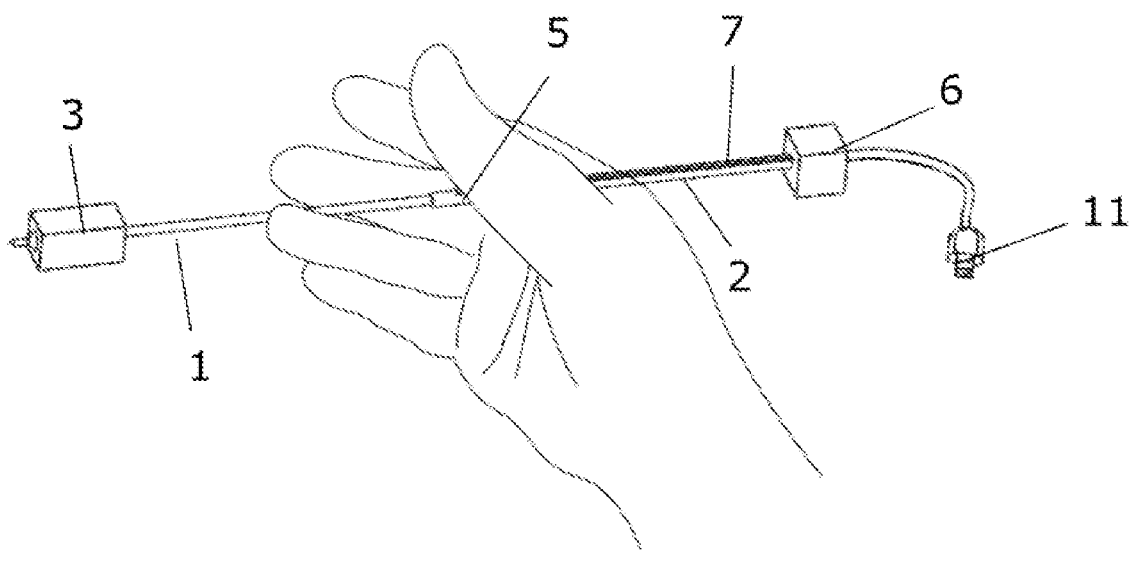
FIG. 2F
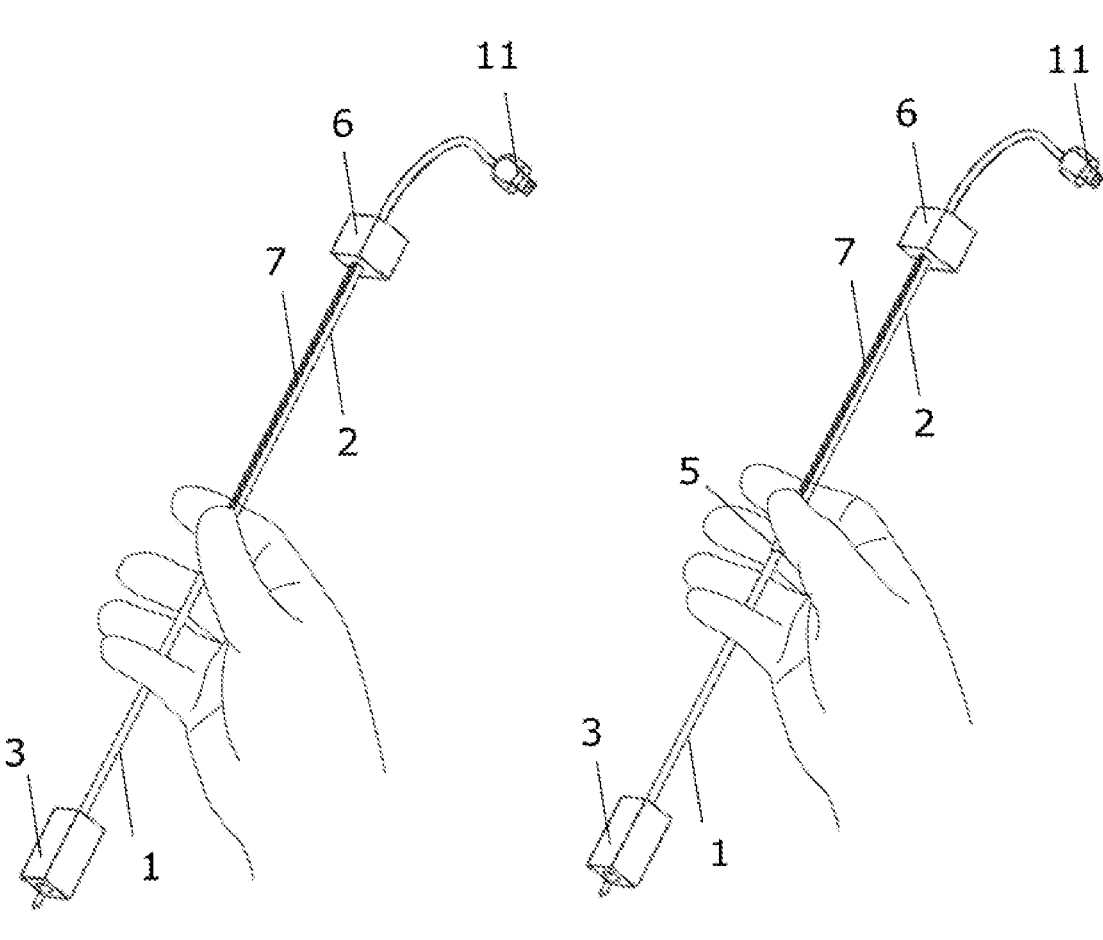
FIG. 2G                    FIG. 2H

FIG. 2I                    FIG. 2J

SIMULATION DEVICE SUITABLE FOR USE IN AUGMENTED-REALITY OR VIRTUAL-REALITY ENVIRONMENTS

FIELD OF THE INVENTION

The present invention is comprised within the field of techniques for simulating the interaction between one or more objects and a device (or tool) controlled by a user, in an augmented reality and/or virtual reality environment. More specifically, the invention relates to a touch device that allows the user to interact with an object, simulating the depositing or removing of material therein, being particularly advantageous in simulating welding techniques and operations, as well as for learning or perfecting same.

STATE OF THE ART

At present, training for professional welders involves a considerable expenditure considerable of material (welding materials, parts, etc.), as well as the generation of emissions and wastes with a high environmental impact. To overcome these problems, Spanish patent ES 2438440 B1 provides an advanced device for training in welding based on augmented reality that can be remotely updated, which makes it possible to provide training in all the known industrial welding techniques. In addition to this reference, is also known the "Soldamatic" technology, marketed by Seabery Augmented Technology SL, as well as the embodiments of United States patent U.S. Pat. No. 10,460,621 B2, which implement different solutions for simulation by means of augmented reality (AR) of various welding exercises, allowing the training and development of technical and professional skills, avoiding the aforementioned economic and environmental damage.

Despite the advantages derived from the application of AR and virtual reality (VR) in welding technique training processes, in the state of the art there is still not any accessory which makes it possible to simulate, with a high degree of similarity, the operations of depositing welding material by means of rods, mainly in TIG (tungsten inert gas) welding techniques or the like. In the known applications, the welding exercise is typically carried out by moving a carbon fiber rod (which replicates the TIG filler rod) closer to or away from a target, although this movement does not correspond entirely with what is done in reality, causing the degree of perfection of these techniques in AR/VR environments to be limited.

Another design proposed to facilitate the movement for depositing material in welding simulation is disclosed in patent document CN 111085757 A. Said document describes a welding wire feed device for TIG argan arc welding, comprising a pen-like wire feeding body (better known as a TIG-PEN), a ceramic nozzle, a guiding tube, a non-return damping device and a second guiding tube. The body is a hollow structure with an assembly hole at the end.

Therefore, the need to obtain devices capable of solving the problem of reproducing in a precise and realistic manner, during simulations of attachment operations (welding, etc.), the movement made by the user (for example, a welder), is raised in the state of the art. The present invention provides a solution to said need by means of a device which allows simulating the depositing of material by touch, in AR/VR simulation, for TIG welding or other similar operations. As will be seen below, the developed device is not limited to just this use in simulated welding in augmented reality and/or virtual reality environments, but rather can be used for another type of simulated operations where an ergonomic solution for the interaction of the user with said VR/AR environments through an actuatable rod-type tool is necessary.

BRIEF DESCRIPTION OF THE INVENTION

The present invention is comprised within the systems of interaction of objects with a tool in augmented reality (AR) or virtual reality (VR) systems and makes it possible to overcome the aforementioned limitations of the state of the art. The main interest of this device, which is closely related to the technological field to which AR/VR belongs, is to help users in the training and learning of manual welding techniques. Advantageously, the device allows the user to reproduce the practice of the movement that is commonly performed with a real TIG welding rod, in a simulated way (instead of merely moving the rod closer or away, as in other known systems, the proximity of which to the real situation is more limited) and safe for the user.

The main object of the invention has, as will be seen, multiple advantages over TIG-PEN type-devices. While the latter moves the rod through the inside of the support in a real way, the device claimed in this application allows performing the same movement to learn the welding technique, but without moving said rod and therefore without actually "consuming" it. Preferably, the device simulates a sensor for the depositing of material in TIG welding. This device is compatible with the aforementioned "Soldamatic" equipment, as well as with the embodiments disclosed in patent document U.S. Pat. No. 10,460,621 B2 and, in general, with any welding simulation system in AR/VR environments.

More specifically, a first object of the present invention relates to a simulation device or tool suitable for use in augmented reality and/or virtual reality environments (AR/VR), which comprises at least the following elements: a rod, spatial location means adapted for recognition by first optical acquisition means to determine the position and orientation of the rod in the augmented reality and/or virtual reality environment; and a touch or fingerprint actuator, also arranged on the rod. Within the scope of the invention, the touch actuator must be understood as any type of actuator which can be operated with the fingers and which allows generating an input of information to the device by electromechanical and/or electronic means, based on the movement the user makes with said fingers.

In preferred embodiments of the invention, the spatial location means of the rod comprises one or more of the following identification elements: (natural or artificial) markers arranged on the rod and encoded with optical information suitable for acquisition thereof by first optical acquisition means (for example, said means can comprise passive cameras that are outside the device or placed in a welding mask); second optical image acquisition means housed therein or attached to the rod; electromagnetic sensors and/or infrared sensors (which allow obtaining the position of the rod by triangulation).

In certain embodiments, the first optical acquisition means can comprise cameras integrated in smart devices (mobile telephone, tablet, etc.). In this way, as a result of the spatial location means, the rod can be located (for example, obtaining in the three-dimensional space its coordinates, its orientation, etc.) in the augmented reality and/or virtual reality environment.

Advantageously, in the device of the invention, the touch actuator comprises encoding means for encoding the movement made, at least, with one of the fingers of the hand of a user of said device, substantially longitudinally along the rod. Said actuator generates a signal, whether analog or digital, in different embodiments of the invention which represents said movement. Advantageously, this allows an ergonomic and simple use of the device for the user. Furthermore, when the device is used as a tool for interaction in an AR/VR environment, it allows performing a wide range of operations (for example, applying or removing a certain amount of material in an object arranged in the AR/VR environment) with great precision.

The markers of the device preferably comprise artificial markers such as LEDs, QR codes, barcodes, retroreflective spheres, and/or printed markers; as well as natural markers such as characteristic points of the object and/or simulated tool (for example, corners, gaps, or contours thereof in the body of the device can be used as characteristic points). In this sense, "encoded information" is to be understood to mean any optical information associated with or comprised in the object in a natural manner or added thereto, which can be picked up by the optical acquisition means and analyzed by the processing unit.

In a preferred embodiment of the device, the touch actuator of the device is integrally attached to the rod and comprises a contact sensor, whether it is a capacitive touch sensor, piezoresistive sensor, piezoelectric sensor, or the like. In this way, the touch actuator is integral with the rod at the time of use thereof, and it can be an actuator integrated therein or outside same. In certain embodiments, the actuator is attached to the rod in a non-permanent but resistant manner (whether with attachments by means of clipping, staples, screws, etc.), causing a firm attachment for performing simulated welding operations.

In one embodiment that is an alternative to the previous embodiment, the actuator of the device comprises an element that is movable with respect to the rod. Preferably, in this embodiment the device further comprises a recoil element connected to the movable element adapted to position the movable element in a reference position along the rod. This recoil element can be easily operated by the user and when released, it returns to a reference position when the user performs an operation on the device with his/her fingers. In some even more preferred embodiments, the rod comprises a stop which defines the mentioned reference position along same. In certain particular embodiments, the recoil element is connected to the rod and to the movable element. Advantageously, in certain embodiments the recoil element comprises a spring or an elastic element.

In other preferred embodiments of the invention, the movable element is at least partially arranged on the recoil element along the rod, externally concealing said recoil element partially or completely. Said recoil element is thereby protected, which increases its durability and eliminates risks of breaking while handling.

In other preferred embodiments of the invention, the standby position of the movable element can advantageously be adjusted through the corresponding adjustment means. As a result of said adjustment, it is possible to lessen the relative distance between the markers and the movable element in said standby position. The functionality of the device of the invention can thereby be adjusted to the measurement of the hand size and finger length of each user, which results in better ergonomics.

In other advantageous embodiments of the device, the encoding means are connected to the movable element. Alternatively, in other embodiments the encoding means are connected to the movable element and/or the recoil element.

In both cases, the movable element can further comprise guides for movement thereof along the rod.

In preferred embodiments of the device, the rod is manufactured from carbon fiber. The rod is thereby very lightweight and resistant, which prevents adding unnecessary weight to the device and provides realism and stability to same. Furthermore, operative difficulties are thus reduced. In alternative implementations, other materials, such as stainless steel or a thermoplastic polymer, depending on the simulated operation, can be used.

In some particular embodiments, the device further comprises processing means and/or transmission means for encoding information generated by the touch actuator. In said embodiment, the information processing means and/or transmission means are arranged outside of the main body of the rod, being connected to same by means of a cable and a corresponding connector. In an alternative or complementary manner, the transmission means can be of the wireless type.

In a preferred embodiment of the device, said device comprises second optical image acquisition means housed therein or attached to the rod. Advantageously, when the system comprises the second optical means, said means are cameras which make it possible to actively locate the device of the invention, which means that it can actively locate itself (for example, by tracking in the image a series of optical markers, whether natural or artificial) and with greater precision than with the first optical means, which are outside the system. In contrast, the first optical information acquisition means comprise passive cameras to detect the device. The system is thereby particularly optimized for those situations in which the use of the device of the invention is to be simulated so as to interact with another object.

In an even more preferred embodiment of the device, the second optical image acquisition means comprise an endoscopic-type camera. The advantage of the endoscopic camera is that it is very compact and is readily molded to any type of tools, particularly those with a cylindrical shape. In other preferred embodiments, the device comprises another type of miniaturized, preferably high-resolution, cameras (for example, with a CCD or CMOS sensor 720/1080 pixels in height and/or width). In alternative embodiments of the device, this further comprises one or more non-optical sensors to improve their precision and robustness, preferably inertia sensors, three-axis inclinometers, haptic sensors, thermal sensors, mechanical sensors, or electromagnetic sensors. Furthermore, these additional sensors allow evaluating, in a quantitative manner, the skill (understood to mean angle of inclination, speed in performing a certain operation, etc.) employed by the user to handle the device and entering additional information in the virtual/augmented reality environment with which the user interacts.

In some embodiments of the device, the touch actuator comprises one or more of the following: a flexible printed circuit board, a linear or angular potentiometer, a capacitive, resistive or magnetic sensor, a Hall effect sensor, a pressure sensor or a rotary encoder.

The first optical means acquire images of a certain operation performed by the user on an object, whether real (in which case it would be an augmented reality system) or virtual (in such case, it would be a virtual reality system).

In a preferred embodiment of the invention, the first optical means are housed in a welding mask, whereas the device (with or without the second optical means integrated therein) simulates a welding torch and/or the elements for depositing material. Said elements for depositing material preferably comprise welding rods or welding electrodes. Furthermore, the object comprises a part on which the application of a welding consumable is simulated.

In other embodiments of the invention, elements and advantages of several of the different preferred embodiments mentioned above are combined.

A second object of the invention relates to an augmented reality and/or virtual reality system, which comprises:

A device according to any of the embodiments described above.

A simulator representing an augmented reality and/or virtual reality environment. In said environment, the device of the invention simulates a tool (for example, a welding electrode) which interacts with an object. Therefore, the simulator is configured to locate the part and the tool within the environment.

First optical image acquisition means (for example, passive cameras, outside the device).

Optionally, second optical image acquisition means (for example, active cameras placed within or attached to the rod of the device itself).

Display means (for example, any LCD display, OLED display, etc.) configured to represent the interaction of the user with the augmented reality and/or virtual reality environment based on the images acquired by the first optical means, optionally by the second optical means, and/or by the information about the interaction provided by the actuator. These display means also represent the position and orientation of the rod within the augmented and/or virtual reality environment.

An information storage and/or processing unit, comprising software/hardware means configured to record, process or transmit in real time the information provided by the actuator to the display means. For example, the information the actuator obtains can represent the amount of material deposited on an object in the AR/VR environment. The software/hardware means comprise computer processing units (CPU), graphic processing units (GPU), storage means in the cloud, etc. Said means are configured to pick up the information about the actuator, digitize it is needed, and send it through a network (local network or Internet) to remote devices for representing the information (displays, etc.).

In certain embodiments of the system of the invention, said system comprises more than one simulation device as described above. In said embodiments, the system comprises univocal identification means for each of the devices, which allows several simulation devices according to the present invention to interact in the same augmented reality and/or virtual reality environment.

Another part of the invention is the method for operating the device described above, such that a user interacts with an augmented reality and/or virtual reality environment by means of said device. The method characteristically comprises a pincer movement with two fingers of the hand on the rod, moving them substantially longitudinally along same and activating, for that purpose, the actuator with at least one of said fingers.

In general, the device, method and system described above are suitable for use in the representation of augmented reality and/or virtual reality environments in simulating techniques of depositing and/or removing welding material, industrial paint and/or surgical and/or odontological procedures.

A preferred use of this invention are AR/VR simulators in which it is necessary to simulate, in a realistic manner, the interaction between the device described above and an object (for example, when a welding electrode is simulated). This type of simulators are particularly useful in the academic field, since they allow practicing and learning processes that require manual skills with the corresponding advantages of AR/VR (such as the savings in material, allowing unlimited practice, the gamification of learning process, enabling a safe environment for learning without the risk of burns for the user, etc.). Advantageously, the device can simulate the application of the welding consumable and how a certain volume of material is deposited to or transferred on the object. In such a way, the touch actuator will be selected so that it is sensitive enough, as required by the specific welding process being simulated. Particularly, the device of the invention can be used in simulating techniques of depositing and/or removing welding material, wherein the simulation device simulates the behavior of a filler rod for TIG (tungsten inert gas) welding. Advantageously, the interaction with the touch sensor emulates in a reliable manner the movement that the welder would made during the actual welding, according to the pincer movement exerted by the user with at least one of the fingers, as described above.

Throughout the description and claims of the present application, the word "comprises" and variants thereof do not intend to exclude other technical features, additives, components or steps. For those skilled in the art, other objects, advantages and features of the invention will be inferred in part from the description and in part from the practice of the invention.

Furthermore, within the scope of the invention when reference is made to means "optical", it is not intended to be limited to the "visible" electromagnetic spectrum, but rather any portion thereof can be used (ultraviolet, infrared, etc.). The concept of "optical information" will also be understood to mean any element that comprises encoded information that can be read or acquired by optical recognition means. Said optical information may, therefore, be encoded in a plurality of physical supports (among them, QR codes, LEDs, images, characters, barcodes, retroreflective spheres, printed markers, etc.) provided that the recognition or reading thereof can be performed by optical means (for example, a camera). Moreover, when reference is made to a "camera", said nomenclature is not limiting, such that it would be equivalent to any device capable of acquiring information in image and/or video form. Lastly, when the term "substantially" is used, it refers to an angle with a tolerance margin of ±10 degrees.

BRIEF DESCRIPTION OF THE FIGURES

A brief description of each of the figures used to complement the following description of the invention is provided below. Said figures refer to the state of the art or to preferred embodiments of the invention, provided as non-limiting examples thereof.

FIGS. 2A-2J show images of the different hand movements made by the user (for example, a welder) to operate the device of the first embodiment. Specifically, FIGS. 2A-2B correspond to a first pincer movement, FIGS. 2C-2D to a second pincer movement, FIGS. 2E-2F to a third pincer movement, FIGS. 2G-2H to a fourth pincer movement and FIGS. 2I-2J to a fifth pincer movement. These preferred movements are particularly useful in welding simulation and correspond with movements made in real welding operations.

| Description of the reference numbers in the figures: | |
| --- | --- |
| (1) | Rod |
| (2) | Touch actuator |
| (3) | Markers |
| (4) | First optical image acquisition means |
| (5) | Movable element |
| (6) | Processing means |
| (7) | Recoil element |
| (8) | Second optical image acquisition means |
| (9) | Stop |
| (10) | Contact sensor |
| (11) | Information transmission means |
| (12) | Touch area |
| (13) | Electronic components case |
| (14) | Guides |
| (15) | Welding mask |
| (16) | Part |
| (17) | Cable |
| (18) | Connector |

DETAILED DESCRIPTION OF THE INVENTION

As described above and as depicted in FIGS. 1-10, a main object of the invention relates to a simulation device suitable for use in augmented reality and/or virtual reality environments, which comprises:

a rod (1);
spatial location means to determine the position and orientation of the rod (1) in the augmented reality and/or virtual reality environment; and
a touch actuator (2) arranged on the rod (1),
wherein the touch actuator (2) comprises encoding means for encoding the movement of at least a finger of the hand of a user of said device, substantially longitudinally along the rod (1).

In particular embodiments, the spatial location means comprise one or more markers (3) arranged on the rod (1), which are preferably encoded with optical information, suitable for acquisition by first optical acquisition means (4) (for example, said means can comprise passive cameras outside the device). Likewise, within the scope of the invention, the touch actuator (2) must be understood to mean any type of actuator that can be operated with the fingers and allows generating an input of information to the device by electromechanical and/or electronic means from the movement made by the user with said fingers.

As particular embodiments, in a manner that does not at all limit the scope of the claims, four examples of possible implementations of the device of the invention in reference to devices for use in TIG welding are described below. However, the technical elements described in each of said examples can be combined with one another in a selective manner, giving rise to additional embodiments of the invention.

First Embodiment

Figure 1:
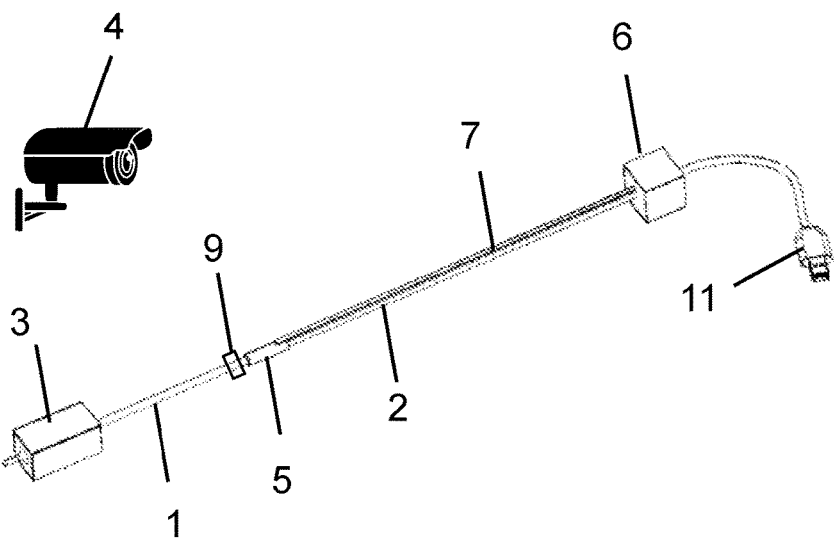
FIG. 1 illustrates a particular embodiment of the invention, hereinafter referred to as "first embodiment", in which the touch actuator is operated with a pincer movement to emulate the movement made by the welder during TIG welding.
Figure 2A:
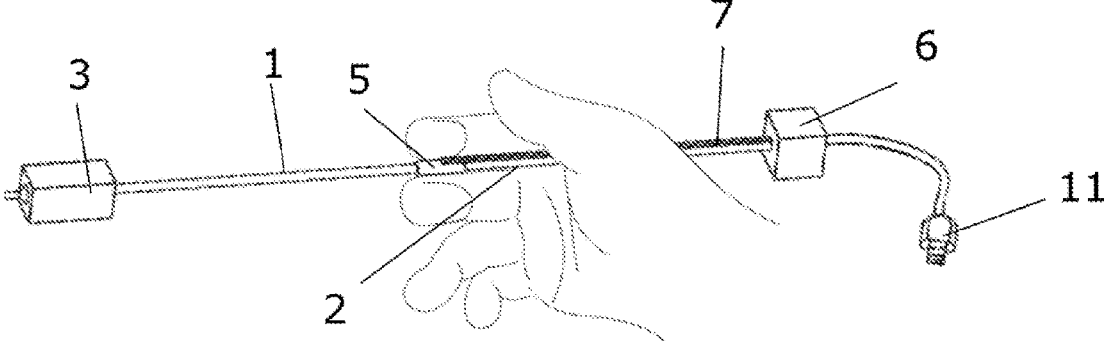
Figure 2B:
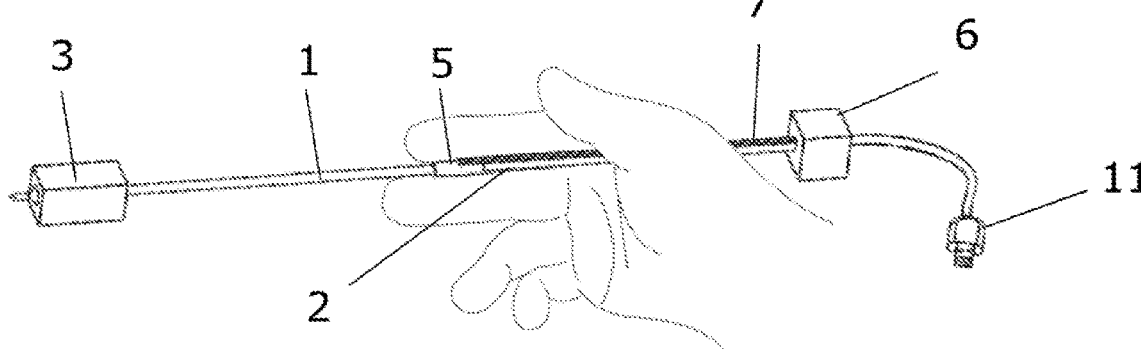
Figure 2C:
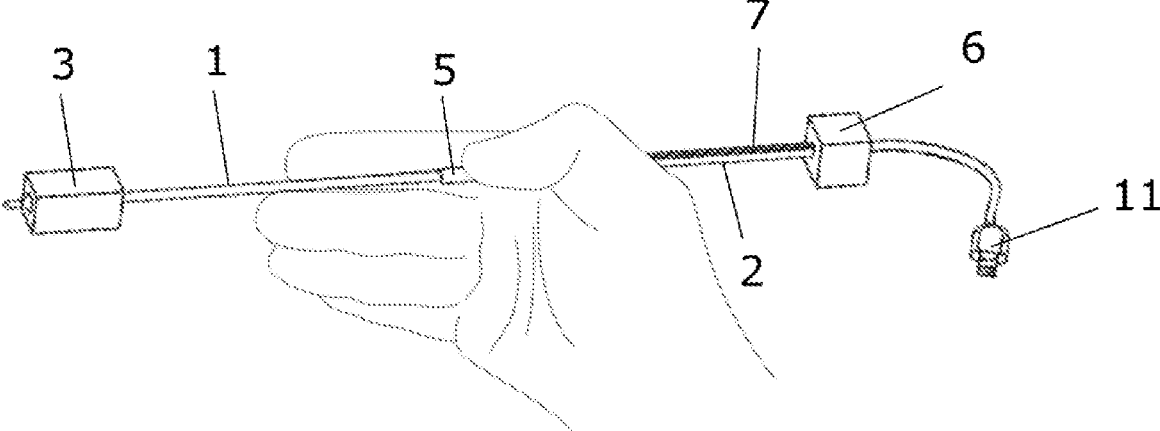
Figure 2D:
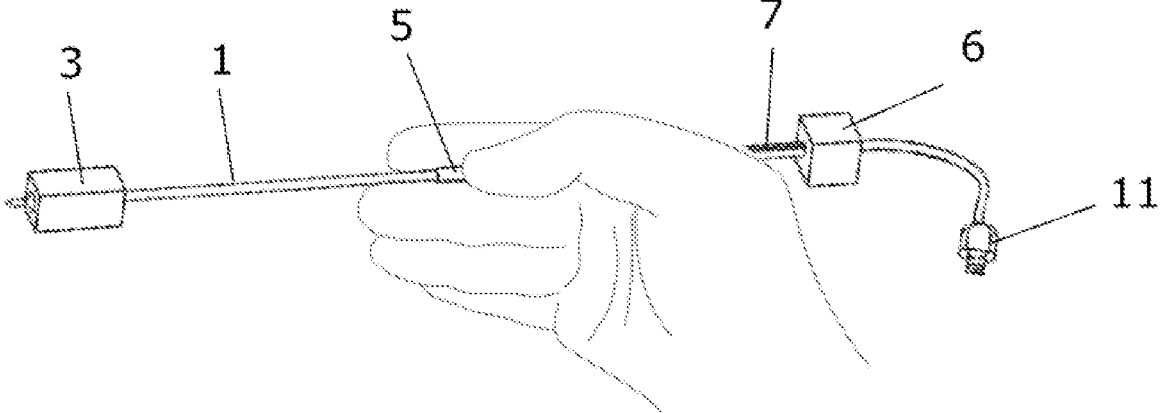
Figure 2E:
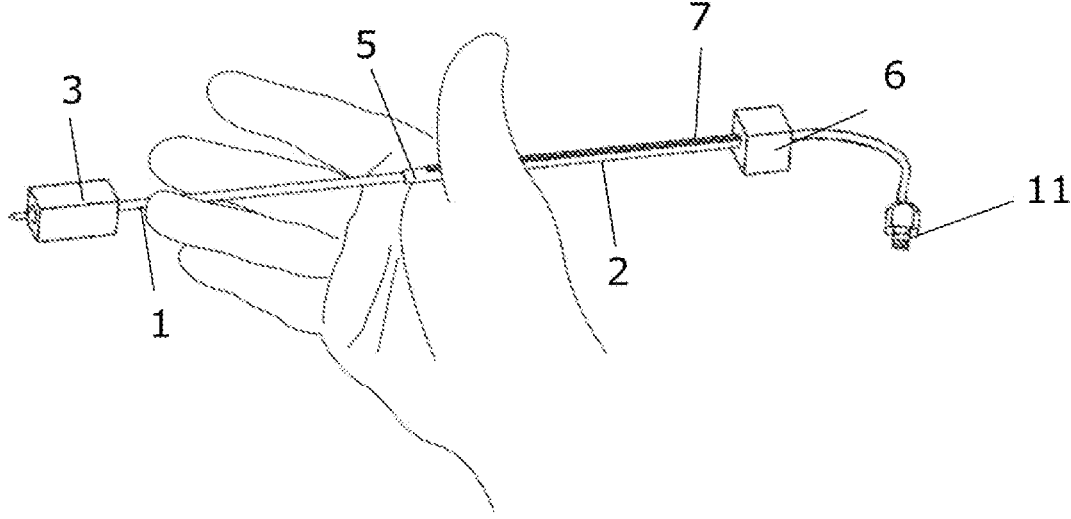

This preferred embodiment, depicted in FIG. 1, electromechanically reproduces the movement of techniques for depositing a TIG rod (1) used by welders. Said movements are based on pinching the TIG rod (1) with the fingers so as to linearly displace same, as se illustrated in FIGS. 2A-2J. Specifically, said FIGS. 2A-2J comprise preferred pincer movements to operate the first embodiment and thereby simulate the depositing of welding material. In the case of this invention, the user will pinch the movable element (5) of the touch actuator (2), which will be moved linearly. Although the mentioned movements of the fingers are reproduced in detail in the embodiment illustrated in FIGS. 2A-2J, they are also generally applicable to any of the embodiments of the invention described herein.

Advantageously in the invention, the linear movement of the movable element (5) is made along the rod (1), which remains stationary, and said movement is detected and measured by processing means (6), in particular, an electromechanical and/or electronic linear measurement system. The displacement will preferably be translated into a transfer of material proportional to the displacement by means of simulation with augmented reality for TIG welding. Furthermore, in order for the user to be able to repeat the gesture multiple times, the device of the invention incorporates a recoil element (7) which, when the user releases the movable element (5), it returns to its initial position, preparing same for a new measurement. Likewise, in any of the embodiments of the invention, the standby position of the movable element (5) can advantageously be adjusted through corresponding adjustment means. As a result of said adjustment, it is possible lessen the relative distance between the markers (3) and the movable element (5) in said standby position. The functionality of the device of the invention can thereby be adjusted to the measurement of the hand size and finger length of each user, which results in better ergonomics.

In turn, the rod (1) mainly comprises a rigid and stationary part of the sensor for depositing TIG material. The main function of this element is, in addition to serving as a gripping point for the user, to serve as a guide for the linear movement of the movable element (5). In this embodiment or in other embodiments of the invention, the rod (1) has a maximum diameter of 5 mm and is of variable length. The rod (1) can be hollow or, alternatively, solid. When it is hollow, the rod (1) can house therein second optical image acquisition means (8). Additionally, the weight of the rod (1) can be adjusted in a non-homogeneous manner along its length, thus adjusting the position for balancing same in the hand of the user.

As mentioned above, the movable element (5) is the part of the device which the user pinches with his/her fingers to perform the gesture of depositing material. For this purpose, the movable element (5) preferably has an orifice or gap (having a cylindrical or approximately cylindrical shape) as a result of which it can be slid along the rod (1). The most common shape is a tube 5 cm in length, although in other embodiments it can adopt other dimensions to make it more ergonomic to grip with the fingers.

The recoil element (7) is in charge of the movable element (5) returning to its initial position once the user has completed the depositing gesture, i.e., when the user releases the movable element (5). This recoil element (7) is connected to the rod (1) and to the movable element (5) and can be, for example, a spring or an elastic element. To ensure that the movable element (5) always returns to the same initial point of reference (that is, the standby position), a stop (9) can additionally be arranged on the rod (1) which defines said initial point.

In a preferred embodiment of the invention, the processing means (6) comprise an electromechanical linear measurement system in charge of measuring the depositing gesture movement through the movable element (5) and sending it through a communication protocol compatible with a computer, such as a USB. The measurement of the movement (displacement) of one or more fingers of the user can be performed through the touch actuator (2), comprising one or more contact sensors (10) which, in turn, comprise at least one of the following elements: a linear or angular potentiometer, a capacitive or resistive linear sensor, a Hall effect sensor (or other magnetic sensors), a pressure sensor or even a rotary encoder. This contact sensor (10) is connected to the movable element (5) with a shaft, tensor or cable. The contact sensor (10) is electronically connected to processing means (6), for example, a microcontroller or CPU (computer processing unit) which is in charge of translating the signals electric to digital information sent through information transmission means (11) and a communication protocol to the simulator of the AR/VR environment, where said information is used as a source of information to update the simulation.

Figure 3A:
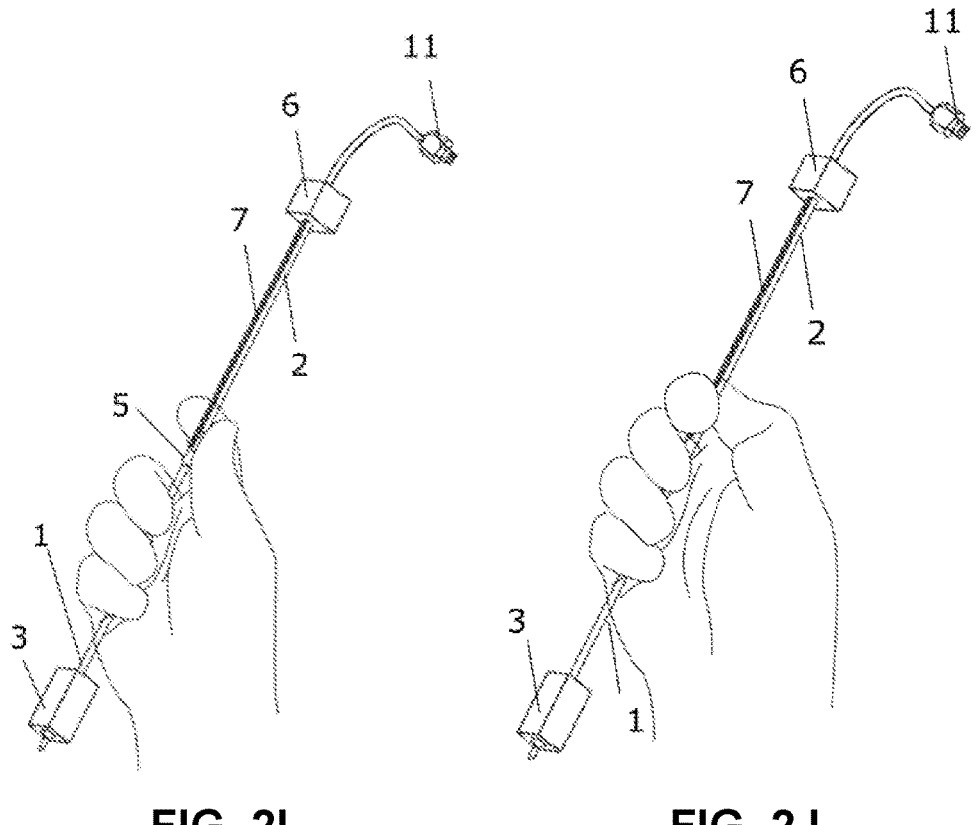
FIGS. 3A-3B correspond to another variant of the first embodiment, respectively in an extended and compressed position, wherein the recoil element comprises an elastic element or spring the compression of which is used to encode the displacement of the telescopic rod.
Figure 3A:
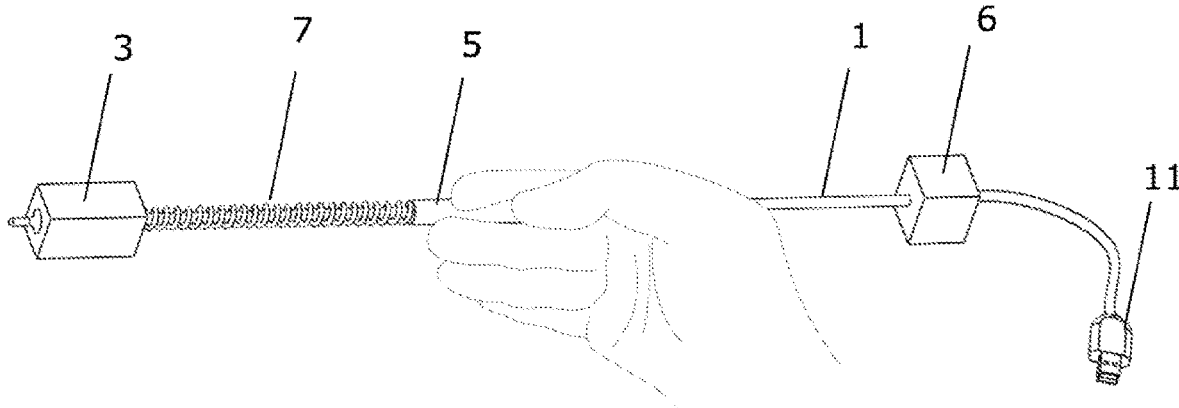
Figure 3B:
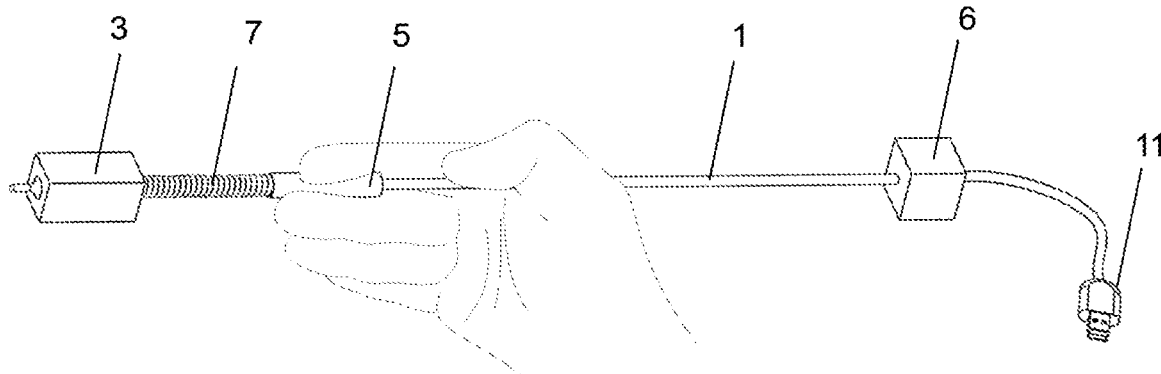

Another variant of this embodiment is shown in FIGS. 3A and 3B, where the recoil element (7) comprises a spring the compression of which is used to encode the displacement of the telescopic rod (1). In particular, FIG. 3A corresponds to the extended position (or standby position) of the spring located in the rod (1), while FIG. 3B corresponds to the compressed position of said spring. Said compression is measured by the touch actuator (2) and is converted into a reading of the displacement performed by the user (which in turn will be encoded as a volume of material deposited) by means of any of the sensors (10) incorporated in the touch actuator (2), as described above.

Second Embodiment

Figure 4:
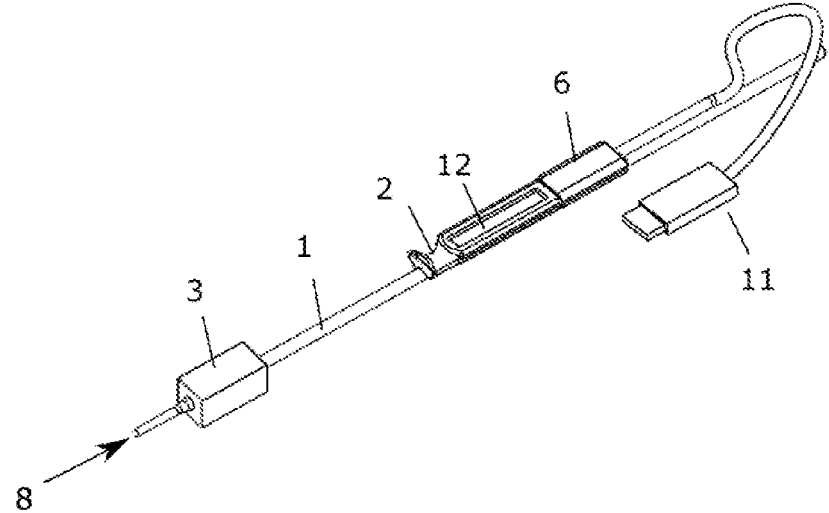
FIG. 4 represents another particular embodiment of the invention, hereinafter referred to as "second embodiment", in which the touch actuator is operated by the user by sliding one or more fingers over same.

This embodiment is shown in FIG. 4. The touch actuator (2) of this embodiment of the device for TIG welding comprises a flexible printed circuit board (PCB), specifically a capacitive electronic board, comprising a contact sensor (10) which detects the sliding of the finger of the user over same, and processing means (6) which translate said sliding into depositing a volume of material simulated in the VR/AR environment. The PCB is placed on an ergonomic support which allows anchoring same to the rod (1).

Figure 5A:
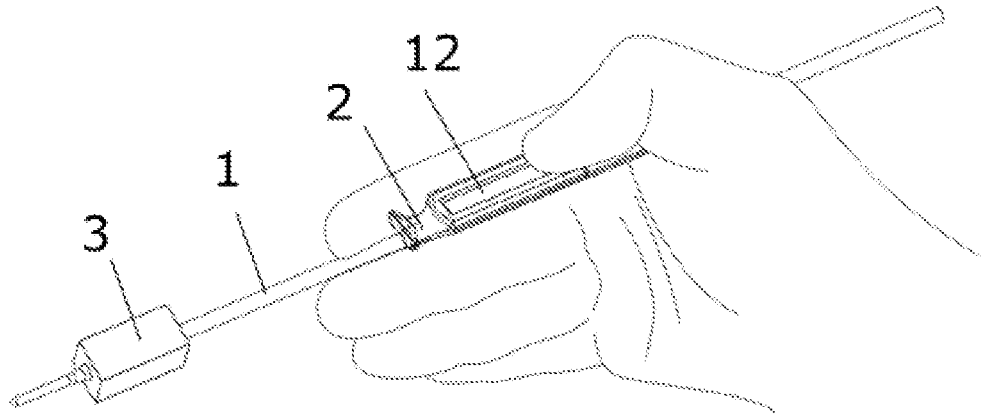
FIGS. 5A-5B illustrate the hand movement made by the welder to operate the device of the second embodiment and preferably consisting of a sliding of a finger over the touch areas of the actuator.
Figure 5B:
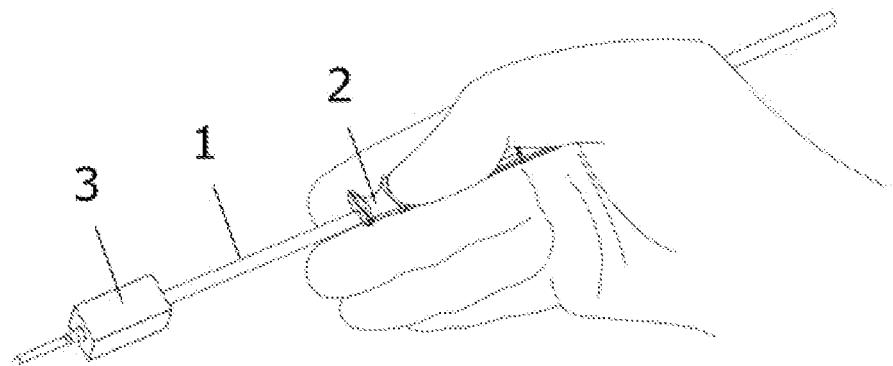

The user performs a linear movement on the board in the touch areas (12) (as shown in FIGS. 5A and 5B, by sliding the finger over said touch areas (12)), which remains stationary. The movement is detected by a contact sensor (10) and is translated, by the processing means (6), into a certain depositing of material proportional to the recorded displacement, for use as input of information to a simulation with augmented reality for TIG welding. The PCB, made of a flexible material, will be coupled to a mechanical support which allows the anchoring thereof to the carbon fiber rod (1) which, up until now, has been used to simulate the welding exercise, making the solution ergonomic and realistic.

The proposed capacitive sensor will be located in an assembly support for the rod (1) which does not have any specific input orifice and can be placed in any of the two directions of longitudinal displacement along the rod (1), which facilitates the user experience.

Figure 6:
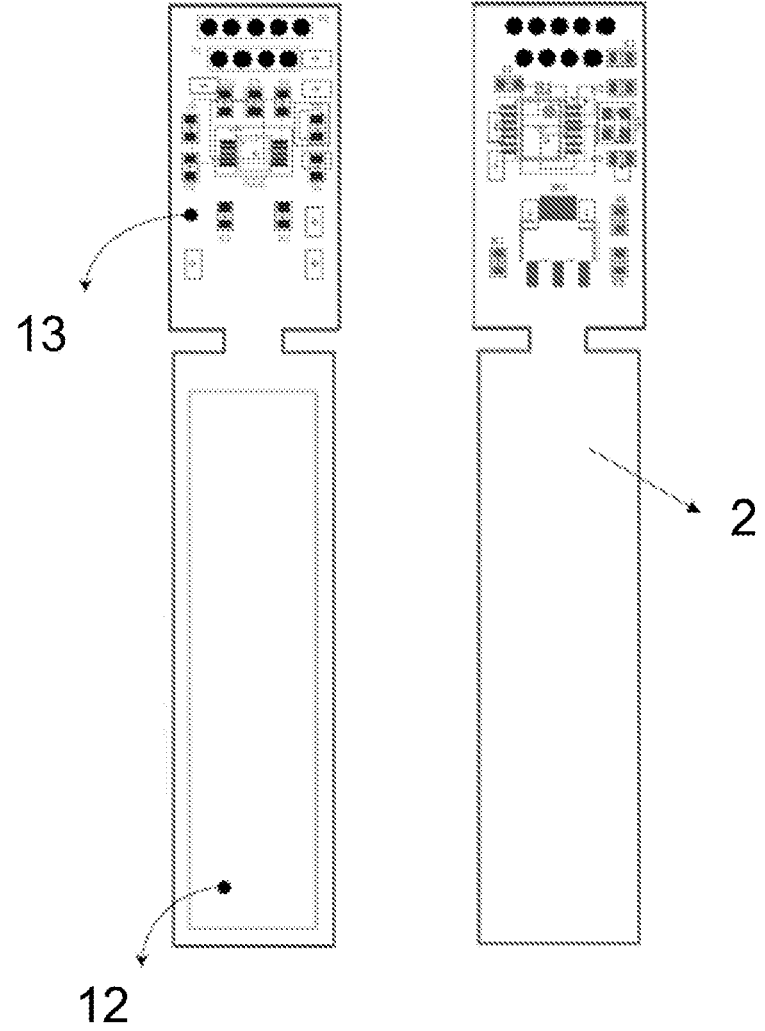
FIG. 6 shows a top view (on the left) and a bottom view (on the right) of a printed circuit board (PCB) that is part of the touch actuator of the second embodiment described in the preceding paragraphs. Said PCB comprises a touch area and an electronic components case.

In this embodiment, the main component of the touch actuator (2) comprises a black, two-layer PCB electronic board made of flexible material and having a thickness of about 0.2 mm, with approximate dimensions of 15 mm in width and 80 mm in length. As illustrated in FIG. 6, in the upper part (wide area) of the PCB there is a case (13) or casing comprising the electronic components (microcontroller, resistors, capacitors, voltage regulators, etc.). Moreover, the part of the PCB exposed to the user, or touch area (12), where the fingers are displaced to simulate the depositing of material is located in the lower part (narrow area free of components and demarcated between white lines).

The operating principle of this electronic board consists of the creation of two touch areas (12) or pads which, associated with a plurality of capacitors, detect in a capacitive manner the proximity of the finger to the circuit. According to the location of the fingerprint along these two touch areas (12), the touch actuator (2) picks up information and then the processing means (6) translate said information into data or signals which mark the exact position of the finger.

This PCB is preferably fed by means of a continuous low voltage source (for example, 5V) and will transmit the data about the position of the fingers through information transmission means (11) which in this case comprise, by way of example, a USB cable. Said cable is preferably welded directly to the PCB board to prevent it from being disconnected.

To assemble the PCB, an ergonomic support can be used, which allows holding and operating same in various ways (as shown in FIGS. 5A-5B), all of which are useful in learning real welding techniques, and adapted to the needs of each user depending on their preference when depositing material. This casing (13) preferably covers the entire PCB, with the exception of the touch areas (12) surrounded by the while frame which indicates the useful area. The support allows assembling the electronic board on same without the need to screw in, glue or anchor same in any other way. The touch area (12') rests on a curved surface surrounding the longitudinally cylindrical rod (1) and is secured on the entire perimeter as a result of guides (14) arranged in the casing. A cover covers the electronic components case (13) and will fix the USB cable by exerting pressure on same.

Figure 7:
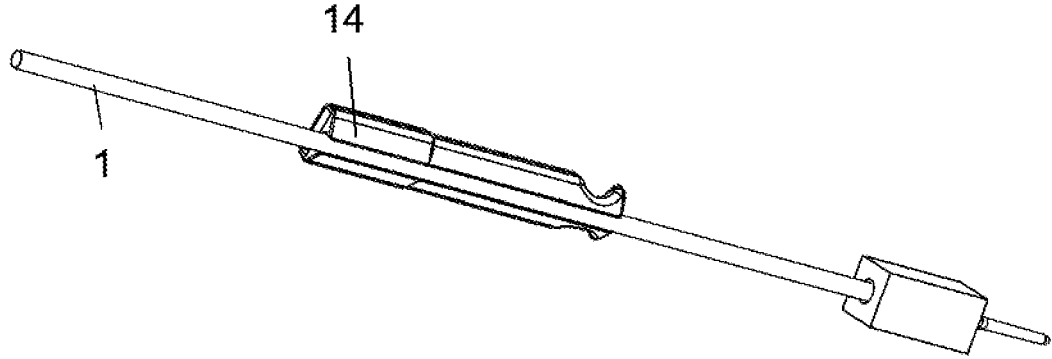
FIG. 7 shows a rear view of the second embodiment, in which the guides for coupling the touch actuator to the rod can be seen.

The manufacturing and assembly process is described in detail below. First, the assembled PCB board is received with all its components, to which the USB cable must be welded. Once both are attached, the PCB is introduced from the upper area to the lower are of the casing (13), carefully displacing the touch area (12) slightly bent longitudinally by the guides (14) arranged for that purpose, as shown in FIG. 7. The assembly with a cover that must be glued to the casing is closed. Lastly, the rod (1) is introduced through the rear area of the device. Additionally, the rod (1) comprises therein a gap for arranging second optical means (8), particularly an endoscopic camera.

Figure 8:
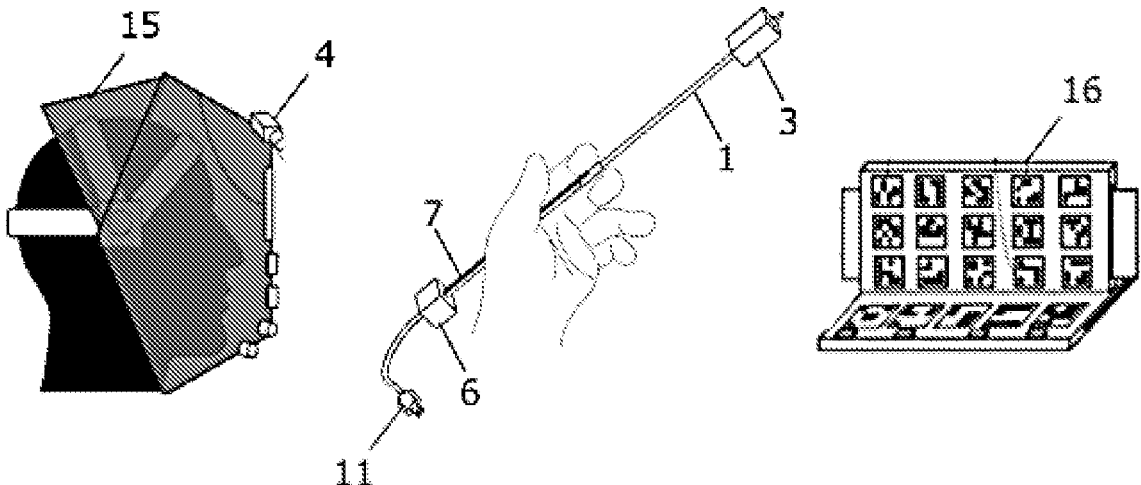
FIG. 8 represents a view of the entire system for a welding simulation application in an augmented or virtual reality environment.

FIG. 8 corresponds to a preferred exemplary system according to the invention, equipped for use in virtual or augmented reality simulations and comprising at least one simulation device as described above. In this case, one or more passive cameras of the first optical means (4) are placed in a welding mask (15) which the user wears for operating on a part (16) on which a simulated welding operation is applied in a virtual or augmented reality environment. The welding mask (15) comprises graphic representation means for displaying the virtual or augmented reality environment. The user performs the simulated operation by means of the device of the invention according to any of the embodiments described above. In alternative embodiments, the system comprising at least one device according to the present invention can be used in any virtual or augmented reality environment to simulate an interaction (for example, the addition of material).

Third Embodiment

Figure 9A:
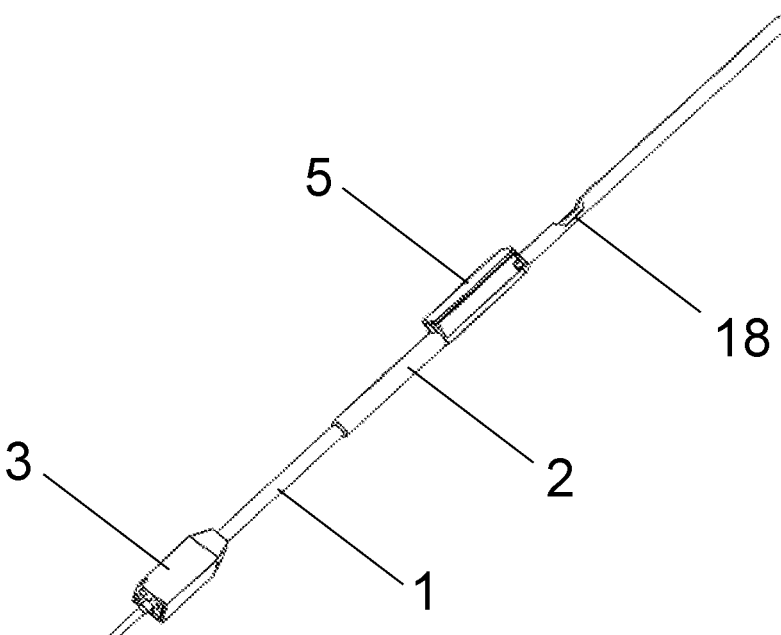
FIGS. 9A-9B show respective views corresponding to two positions of the movable element of a device according to the invention in an embodiment thereof referred to as "third embodiment", wherein the movable element is arranged at least partially on the recoil element along the rod, externally concealing said recoil element partially or completely, and the latter being out of view for the user.
Figure 9B:
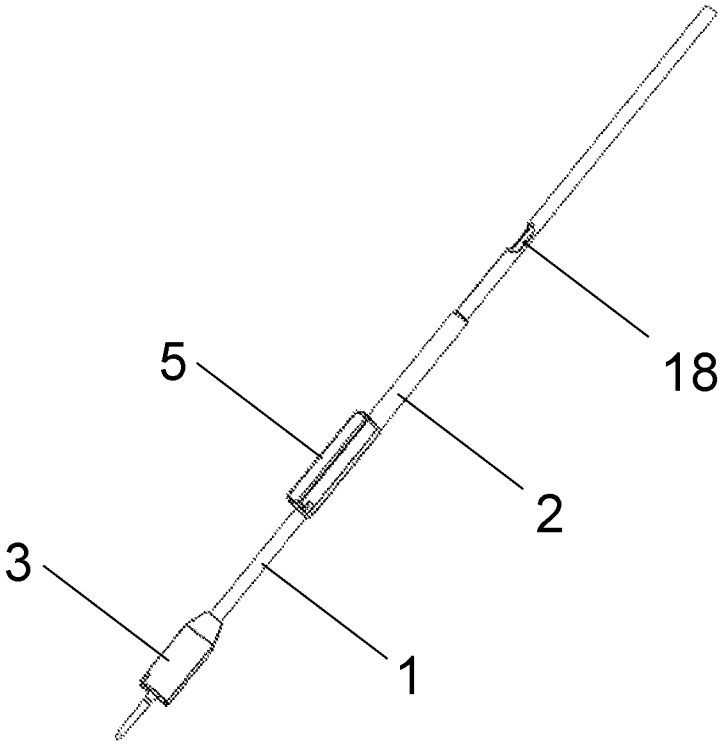

FIGS. 9A-9B show respective views of a device according to the invention, according to an embodiment thereof, in which the movable element (5) is arranged at least partially on the recoil element (7) (not depicted in the figure as it is arranged inside the movable element (5)) along the rod (1), thus concealing said recoil element (7) partially or completely, and the latter being out of view for the user.

Fourth Embodiment

Figure 10A:
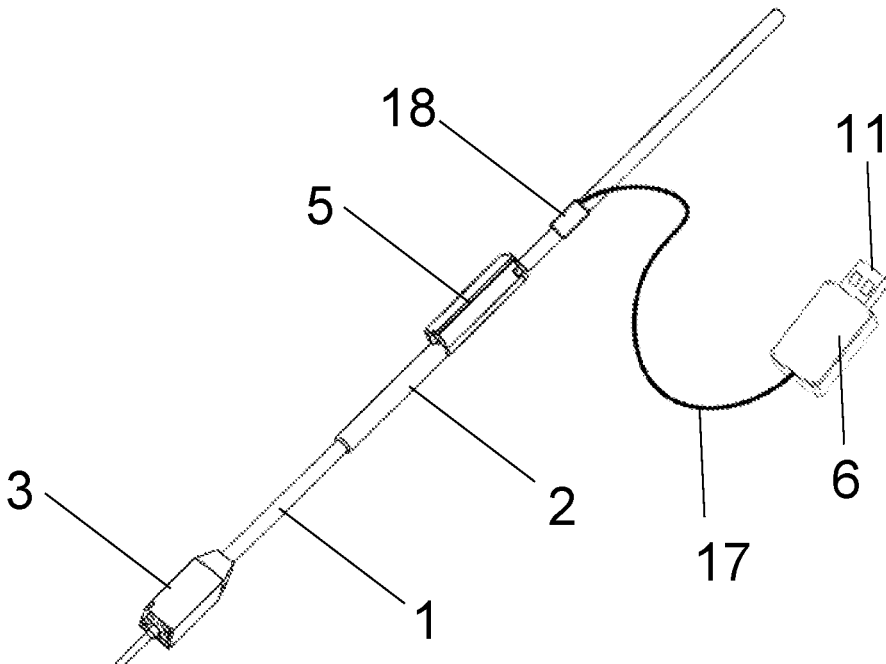
FIGS. 10A-10B show respective views, corresponding to two positions of the movable element of a device according to the invention in an embodiment thereof referred to as "fourth embodiment", in which the information processing means and transmission means are arranged outside of the main body of the rod, and connected to same by means of a cable and a connector corresponding.
Figure 10B:
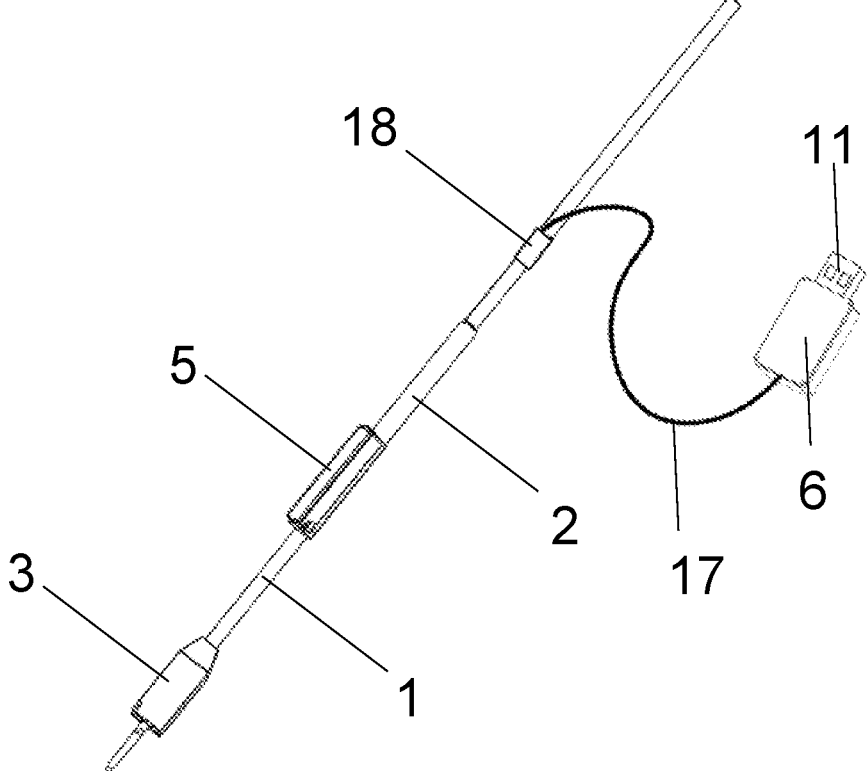

FIGS. 10A-10B show respective views of a device according to the invention, according to an embodiment thereof, in which the information processing means (6) and/or transmission means (11) are arranged outside of the main body of the rod (1), being connected to same by means of a cable (17) and a corresponding connector (18) (also depicted in FIGS. 9A-9B).

Other Preferred Embodiments

Alternatively, USB communication could be replaced with Bluetooth or generally any other wireless communication protocol.

Other alternative embodiments of the device include a securing element (for example, a Velcro strap attached to the wrist of the user) through which the USB cable passes, to prevent destabilizing the rod (1) or any unwanted turning thereof.

Other embodiments of the invention are a variant of the first embodiment, further comprising a hollow rod (1) for housing the second optical means (8), for example, an endoscopic camera.

In further additional embodiments of the invention, the non-optical sensors (inclinometers, etc.) provide additional information (speed with which device is used, orientation, etc.) which allow encoding in the VR/AR environment interactions that are more complex than depositing or removing material.

In alternative embodiments of the invention, the touch actuator (4) and the rod (1) are integrated therein. For example, in such embodiments the printed circuit board can be rigid or preferably flexible and adaptable to the shape of the rod (1) to be arranged surrounding same.

The invention claimed is:

1. A TIG welding filler rod simulation device, suitable for use in an augmented reality or virtual reality environment, comprising:
   a rod;
   spatial location elements arranged on the rod, said spatial location elements being adapted for recognition by first sensors to determine a position and an orientation of the rod in the augmented reality or virtual reality environment; and
   a touch actuator arranged on the rod,
   wherein the touch actuator comprises:
      a movable element that is movable substantially longitudinally along the rod;
      a recoil element adapted to position the movable element in a reference position along the rod;
      at least one selected from an electronic and an electromechanical encoder, adapted for encoding input information for simulating a deposition of filler welding material based on a movement of at least a finger of a hand of a user of the device by moving the movable element of the touch actuator.

2. The device according to claim 1, wherein the spatial location elements of the rod comprises at least one selected from:
   markers arranged on the rod and encoded with optical information suitable for recognition by the first sensors;
   optical image acquisition sensors;
   electromagnetic sensors; and
   infrared sensors.

3. The device according to claim 1, further comprising non-optical sensors, wherein the non-optical sensors comprise at least one selected from inertia sensors, three-axis inclinometers, haptic sensors, thermal sensors, mechanical sensors and electromagnetic sensors.

4. The device according to claim 1, wherein the touch actuator is integrally attached to the rod, and wherein the touch actuator comprises a contact sensor.

5. The device according to claim 1, wherein the movable element comprises a stop which defines a reference position along the rod.

6. The device according to claim 1, wherein the recoil element is connected to the rod and to the movable element.

7. The device according to claim 1, wherein the recoil element comprises a spring or an elastic element.

8. The device according to claim 1, wherein the movable element is at least partially arranged on the recoil element along the rod, externally concealing said recoil element partially or completely.

9. The device according to claim 1, wherein the encoder is communicatively connected to the movable element.

10. The device according to claim 1, wherein the movable element further comprises guides for movement thereof along the rod.

11. The device according to claim 1, wherein the encoder is communicatively connected to at least one of the movable element and the recoil element.

12. The device according to claim 1, further comprising an adjustment element adapted for adjusting a standby position of the movable element along the rod.

13. The device according to claim 1, comprising at least one selected from a processor adapted for processing the encoded information; and a transmitter adapted for transmitting the encoded information generated by the touch actuator.

14. The device according to claim 13, wherein the at least one selected from the processor and the transmitter is arranged outside of a main body of the rod, being connected to said main body by at least one selected from a cable and a connector.

15. The device according to claim 13, wherein the transmitter is a wireless transmitter.

16. The device according to claim 1, wherein the touch actuator comprises at least one selected from a flexible printed circuit board, a linear or angular potentiometer, a capacitive or resistive sensor, and a Hall effect sensor or a rotary encoder.

17. An augmented reality or virtual reality system, comprising:
  a TIG filler rod simulation device according to claim 1;
  a simulator representing an augmented reality or virtual reality environment;
  first sensors;
  display means configured to represent an interaction of a user with the augmented reality or virtual reality environment based on tracking information acquired by the first sensors, or by information about an interaction provided by the touch actuator;
  an information storage and processing unit adapted to record, process or transmit, in real time, the input information encoded by the encoder of the touch actuator for simulating the deposition of filler welding material, and for displaying a simulation of said deposition of filler welding material in the display means.

18. A method for interaction of a user with an augmented reality and/or virtual reality environment by means of a device according to claim 1, wherein the method comprises performing a movement with two fingers of a hand on the rod of the device, moving the movable element substantially longitudinally along the rod and activating, for that purpose, the touch actuator with at least one of said two fingers, thereby generating encoded information based on the movement of the user's fingers.

* * * * *